(12) United States Patent  (10) Patent No.: US 8,112,128 B2
Lee  (45) Date of Patent: Feb. 7, 2012

(54) DISCREETLY POSITIONABLE CAMERA HOUSING

(75) Inventor: Wicky Lee, Gunpo (KR)

(73) Assignee: Flextronics AP, LLC, Broomfield, CO (US)

( * ) Notice: Subject to any disclaimer, the term of this patent is extended or adjusted under 35 U.S.C. 154(b) by 773 days.

(21) Appl. No.: 11/897,677

(22) Filed: Aug. 31, 2007

(65) Prior Publication Data

US 2008/0058010 A1 Mar. 6, 2008

Related U.S. Application Data

(60) Provisional application No. 60/841,879, filed on Aug. 31, 2006.

(51) Int. Cl.
*H04M 1/00* (2006.01)

(52) U.S. Cl. .......... 455/575.1; 455/556.1; 16/224

(58) Field of Classification Search .......... 455/556.1, 455/575.1–575.9; 396/341–350; 16/224, 16/284, 322, 348
See application file for complete search history.

(56) References Cited

U.S. PATENT DOCUMENTS

| | | | |
|---|---|---|---|
| 2,279,372 A | 4/1942 | Herzberger | 88/57 |
| 3,087,384 A | 4/1963 | Baur et al. | 88/57 |
| 3,599,377 A | 8/1971 | Dartnell | 51/284 |
| 3,609,270 A | 9/1971 | Jorgensen et al. | 200/67 |
| 4,257,086 A | 3/1981 | Gulliksen | |
| 4,290,168 A * | 9/1981 | Binge | 16/271 |
| 4,879,592 A | 11/1989 | Ernest | 358/42 |
| 5,016,993 A | 5/1991 | Akitake | 350/429 |
| 5,095,204 A | 3/1992 | Novini | 250/223 B |
| 5,177,638 A | 1/1993 | Emura et al. | 359/704 |
| 5,196,963 A | 3/1993 | Sato et al. | 359/699 |
| 5,272,567 A | 12/1993 | Inoue | 359/696 |
| 5,546,147 A | 8/1996 | Baxter et al. | 354/187 |
| 5,689,746 A | 11/1997 | Akada et al. | |
| 5,754,210 A | 5/1998 | Haneda et al. | 347/116 |
| 5,805,362 A | 9/1998 | Hayes | 359/819 |
| 5,835,208 A | 11/1998 | Hollmann et al. | 356/124 |
| 5,926,965 A | 7/1999 | Shijo et al. | 33/390 |
| 5,954,192 A | 9/1999 | Iitsuka | 200/336 |
| 5,966,248 A | 10/1999 | Kurokawa et al. | 359/697 |

(Continued)

FOREIGN PATENT DOCUMENTS

CN 1324012 A 11/2001

(Continued)

OTHER PUBLICATIONS

Non-Final Office Action dated Jun. 11, 2009, U.S. Appl. No. 12/287,469, filed Oct. 8, 2008, Westerweck, Lothar.

(Continued)

*Primary Examiner* — Kent Chang
*Assistant Examiner* — Marcus Hammonds
(74) *Attorney, Agent, or Firm* — Haverstock & Owens LLP

(57) ABSTRACT

A camera housing positionably coupled to an electronic appliance is disclosed. Preferably, the camera housing is positionable in two discrete positions such that the camera can be positioned to face towards or away from the user. The appliance includes a recess sized to receive the camera housing. A cellular telephone includes a camera housing which is positionable in two discrete positions. In the first position, the camera faces the user. In the second position, the camera faces away from the user. The camera housing is coupled to the cellular telephone by a hinge mechanism that latches the camera into one of the two positions.

14 Claims, 6 Drawing Sheets

Front View                Back View

U.S. PATENT DOCUMENTS

| | | | |
|---|---|---|---|
| 6,091,902 A | 7/2000 | Komatsuzaki et al. | 396/60 |
| 6,282,380 B1 | 8/2001 | Yamamoto | |
| 6,292,306 B1 | 9/2001 | Betensky | 359/663 |
| 6,330,400 B1 | 12/2001 | Bittner et al. | 396/72 |
| 6,417,601 B1 | 7/2002 | Kim | 310/333 |
| 6,530,703 B2 | 3/2003 | Nakano et al. | |
| 6,597,516 B2 | 7/2003 | Saitoh et al. | 359/694 |
| 6,682,161 B2* | 1/2004 | Yun | 312/405 |
| 6,760,167 B2 | 7/2004 | Meehan et al. | 359/822 |
| 6,762,888 B1 | 7/2004 | Oshima | 359/696 |
| 6,792,246 B2 | 9/2004 | Takeda et al. | 455/41.1 |
| 6,805,499 B2 | 10/2004 | Westerweck et al. | 396/448 |
| 6,869,233 B2 | 3/2005 | Westerweck et al. | 396/460 |
| 6,940,209 B2 | 9/2005 | Henderson | 310/323.02 |
| 7,010,224 B2 | 3/2006 | Nomura | 396/85 |
| 7,088,525 B2 | 8/2006 | Finizion et al. | 359/703 |
| 7,156,564 B1 | 1/2007 | Watanabe et al. | |
| 7,193,793 B2 | 3/2007 | Murakami et al. | 359/791 |
| 7,259,497 B2 | 8/2007 | Sakano et al. | |
| 7,301,712 B2 | 11/2007 | Kamo | 359/785 |
| 7,330,648 B2 | 2/2008 | Morinaga et al. | 396/144 |
| 7,379,112 B1 | 5/2008 | Raad | |
| 7,394,602 B2 | 7/2008 | Chen et al. | 359/785 |
| 7,400,454 B2 | 7/2008 | Kubota et al. | 359/689 |
| 7,420,609 B2 | 9/2008 | Yamaguchi et al. | 348/335 |
| 7,605,991 B2 | 10/2009 | Chiang | |
| 7,670,067 B2 | 3/2010 | Utz | |
| 7,675,565 B2 | 3/2010 | Cheng | |
| 7,806,606 B2 | 10/2010 | Westerweck | |
| 2002/0012066 A1 | 1/2002 | Nagai | |
| 2002/0018140 A1 | 2/2002 | Suemoto et al. | 348/358 |
| 2002/0102946 A1 | 8/2002 | SanGiovanni | 455/90 |
| 2002/0136556 A1 | 9/2002 | Nomura et al. | |
| 2002/0142798 A1* | 10/2002 | Miyake | 455/556 |
| 2002/0144369 A1* | 10/2002 | Biggs et al. | 15/143.1 |
| 2003/0012573 A1 | 1/2003 | Sekizawa et al. | |
| 2003/0174419 A1 | 9/2003 | Kindler et al. | 359/819 |
| 2004/0017501 A1* | 1/2004 | Asaga et al. | 348/340 |
| 2004/0042780 A1 | 3/2004 | Kindaichi et al. | |
| 2004/0042785 A1 | 3/2004 | Watanabe et al. | |
| 2004/0042786 A1 | 3/2004 | Watanabe et al. | |
| 2004/0056970 A1 | 3/2004 | Westerweck et al. | 348/240.3 |
| 2004/0056974 A1 | 3/2004 | Kitajima et al. | |
| 2004/0057720 A1 | 3/2004 | Westerweck et al. | |
| 2004/0203532 A1 | 10/2004 | Mizuta | 455/90.3 |
| 2004/0223068 A1 | 11/2004 | Kamo | |
| 2004/0258405 A1 | 12/2004 | Shiratori et al. | 396/458 |
| 2005/0014538 A1* | 1/2005 | Hyun et al. | 455/575.4 |
| 2005/0063698 A1 | 3/2005 | Usuda et al. | |
| 2005/0157195 A1* | 7/2005 | Ohashi et al. | 348/333.06 |
| 2005/0162534 A1 | 7/2005 | Higashiyama et al. | |
| 2005/0248684 A1 | 11/2005 | Machida | |
| 2005/0264670 A1 | 12/2005 | Yamaguchi et al. | 348/335 |
| 2006/0049720 A1 | 3/2006 | Henderson et al. | 310/328 |
| 2006/0056389 A1 | 3/2006 | Monk et al. | 370/352 |
| 2006/0083503 A1 | 4/2006 | Fukai | |
| 2006/0103754 A1 | 5/2006 | Wenstrand et al. | |
| 2006/0113867 A1 | 6/2006 | Sakatani et al. | 310/323.17 |
| 2006/0124746 A1* | 6/2006 | Kim et al. | 235/472.02 |
| 2006/0209205 A1 | 9/2006 | Tsai | |
| 2006/0261257 A1* | 11/2006 | Hwang | 250/216 |
| 2006/0291061 A1 | 12/2006 | Iyama et al. | 359/614 |
| 2007/0053672 A1 | 3/2007 | Westerweck et al. | 396/79 |
| 2007/0074966 A1 | 4/2007 | Yamamoto et al. | 200/547 |
| 2007/0077051 A1 | 4/2007 | Toor et al. | 396/144 |
| 2007/0077052 A1 | 4/2007 | Chang | 396/144 |
| 2007/0086777 A1 | 4/2007 | Fujita | 396/452 |
| 2007/0108847 A1 | 5/2007 | Chang | |
| 2007/0122146 A1 | 5/2007 | Ryu | 396/529 |
| 2007/0146489 A1 | 6/2007 | Kosako et al. | |
| 2007/0154198 A1 | 7/2007 | Oh et al. | |
| 2007/0201866 A1 | 8/2007 | Kihara | |
| 2007/0280667 A1 | 12/2007 | Shin | |
| 2011/0052183 A1 | 3/2011 | Westerweck | |

FOREIGN PATENT DOCUMENTS

| | | |
|---|---|---|
| EP | 1148406 A2 | 10/2001 |
| EP | 1148406 A3 | 6/2002 |
| EP | 1357726 A1 | 10/2003 |
| GB | 1378515 | 12/1974 |
| GB | 2315186 A | 1/1998 |
| GB | 2387063 A | 10/2003 |
| JP | 402123335 A | 5/1990 |
| JP | 11-72678 | 3/1999 |
| JP | 2002-286987 | 10/2002 |

OTHER PUBLICATIONS

Office Action regarding Chinese Patent Application No. 200680041383.0, Application Date: Sep. 5, 2006, date of Office Action: Dec. 18, 2009, 8 pages.

"High Precision Optical Assembly Starts Here," (4 pages) 1996, Opto-Alignment Technology, Inc.

Chinese foreign office action, patent application No. 200780047588.4, application date: Dec. 21, 2007, applicant: Flextronics AP, LLC., date of issue Sep. 19, 2010, title of Invention: "Three-Element Photographic Objective with Reduced Tolerance Sensitivities", 13 pages.

* cited by examiner

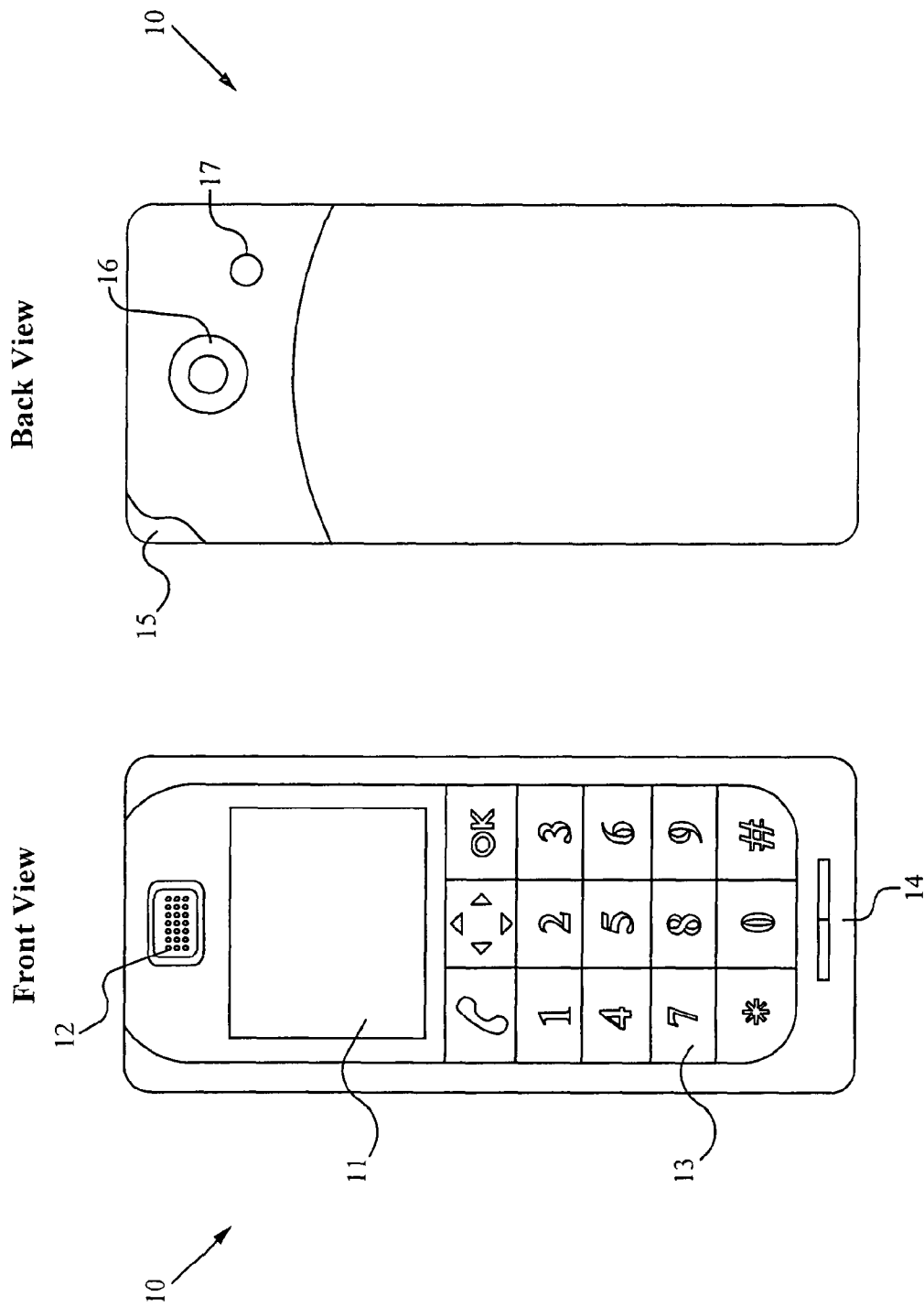

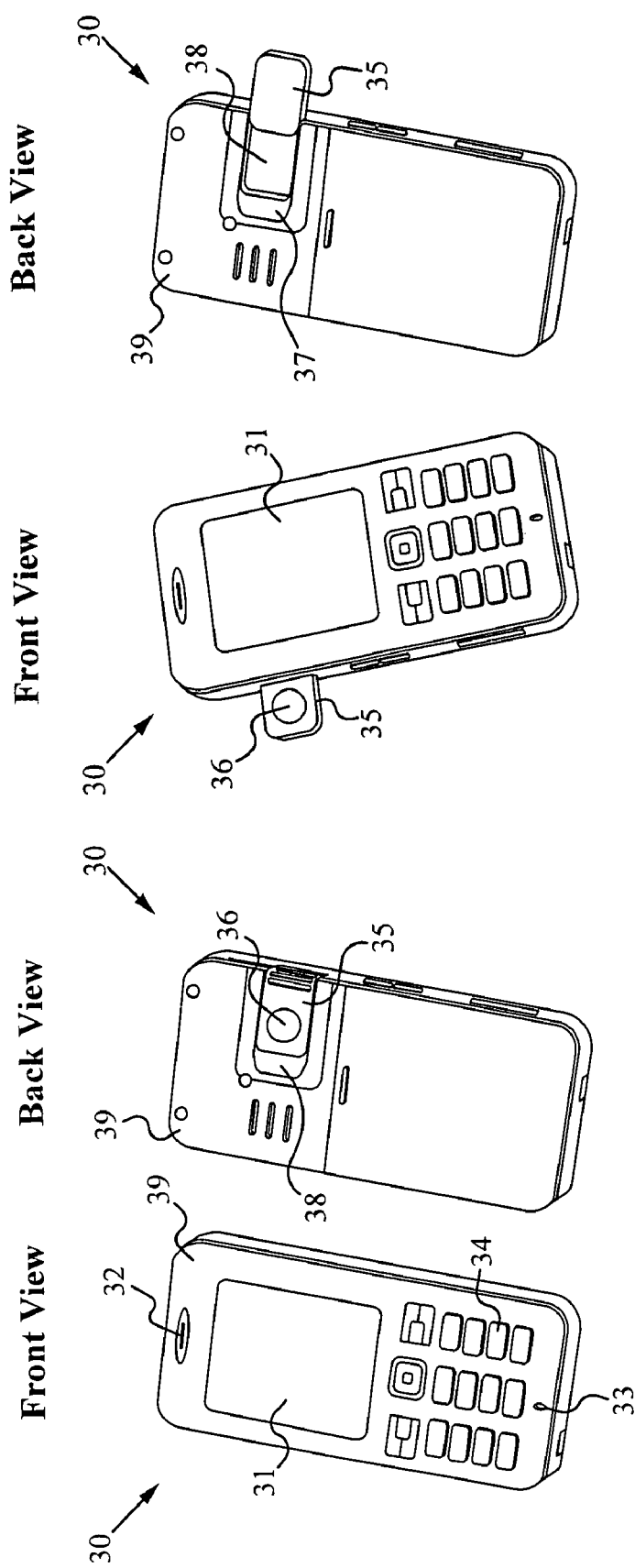

DISCREETLY POSITIONABLE CAMERA HOUSING

CROSS REFERENCE TO RELATED APPLICATIONS

This application claims priority of Provisional Patent Application Ser. No. 60/841,879 filed Aug. 31, 2006 and entitled: MECHANISM OF CAMERA ROTATION AT MOBILE HANDSET. The Provisional Patent Application Ser. No. 60/841,879 filed Aug. 31, 2006 and entitled: MECHANISM OF CAMERA ROTATION AT MOBILE HANDSET is hereby incorporated by reference.

FIELD OF THE INVENTION

This invention is in the field of cameras. More specifically, it is in the field of cameras that are positionably coupled to an electronic appliance.

BACKGROUND OF THE INVENTION

Many handheld or otherwise portable electronic appliances are equipped with cameras. The most popular of such appliances is the cellular telephone. The cellular telephone has become a ubiquitous tool necessary in daily life for communication and entertainment. With the advent of camera phones, users are now able to send and receive pictures via their cellular phones. However, most camera phones in current practice have cameras in a fixed position, usually facing opposite the display screen. This causes the user difficulty in taking self portraits, or using the camera phone for video conferencing.

One attempt to solve this problem has been to place a small mirror close to the camera so the user can see their reflection to have an estimate of the photo the camera will take. However, such small mirrors provide an image that is not identical to the image received by the camera lens, are easily tarnished, scratched, and often become unusable shortly into the life of the device.

Another attempt at a solution is a camera that is rotatably mounted on the hinge of a flip style cellular phone. However, this approach is necessarily constrained to a flip style camera phone.

Another attempt in current practice is a barrel rolling mechanism integrated in the phone or appliance to house the camera. While this proposal can be applied to any type of phone or other electronic appliance, it uses valuable space for the barrel rotation mechanism. Space comes at a greater premium as cellular telephones increase in complexity and function while consumers demand smaller form factors. Furthermore, both these attempts discussed provide a wide range of lens angles in which the camera housing can be positioned. This is not necessary. This is also unnecessarily complex. The wide range of angles at which the current solutions can be positioned is burdensome since often times the user must adjust both the camera position and the direction in which the camera is being pointed. What is needed is a camera housing that is adaptable to an electronic appliance such as a cellular phone, PDA, a laptop computer, a desktop computer, a multimedia center, a portable music player, or any other suitable device, that is positionable in two discrete positions: one that faces substantially towards the user and one that faces substantially away from the user.

SUMMARY OF THE INVENTION

A camera with a housing is positionably coupled to an electronic appliance. Preferably, there are two discrete positions for the camera. The camera housing is positionable in discrete positions such that the camera faces towards the user or away from the user is disclosed. The camera housing is coupled to the appliance by a hinge mechanism. By way of example, the appliance can be a cellular phone, laptop computer, desktop computer, digital cameras, PDA, multimedia device, or portable music player. Other appliances are possible.

In the preferred embodiment, a cellular phone has a casing. A positionable camera housing is coupled to the casing. The camera housing is positionable in two discrete positions: a first position wherein the camera faces substantially toward the user and a second position wherein the camera faces substantially away from the user. In some embodiments, the casing has a recessed cavity which has a top surface and a bottom surface. The recessed cavity is configured to be of a shape and size to receive the camera housing in its second position. Also, it is preferable that the casing further comprises a depression along the recessed cavity such that the users can manipulate the camera housing between positions with their fingers.

The cellular telephone comprises a hinge mechanism to couple the camera housing to the casing. The hinge mechanism comprises a first pivot on the top surface of the camera housing and a second pivot on the bottom surface of the camera housing. The pivots can be configured to couple with a first socket on the top surface of the recessed cavity and a second socket on the bottom surface of the recessed cavity. In some embodiments, the first socket further comprises two indentations along its inside surface. Alternatively, the second socket can comprise two indentations along its inside surface. The hinge mechanism further comprises a latching sleeve configured to couple between the first pivot and the first socket. Alternatively, it can be configured to couple between the second pivot and the second socket. The latching sleeve comprises a latching protrusion configured to latch into one of the two indentations along the inside surface of the first or second socket, causing the camera housing to lock in one of the two desired positions.

BRIEF DESCRIPTION OF THE SEVERAL VIEWS OF THE DRAWINGS

FIG. 1 shows a prior art camera phone.

FIGS. 3A-3B show a camera phone having a positionable camera housing in the current disclosure.

DETAILED DESCRIPTION

Figure 2A:
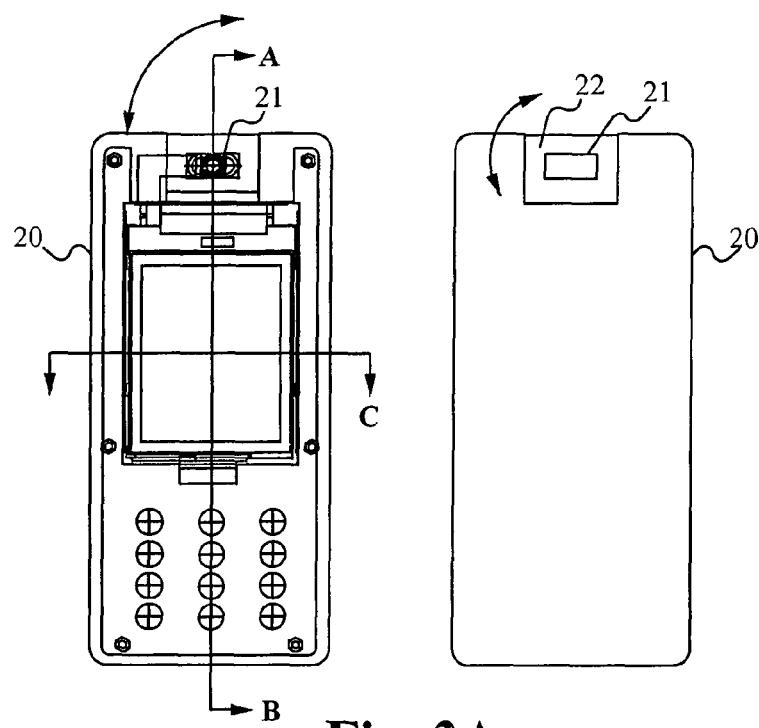
FIGS. 2A-2C show a prior art camera phone wherein the camera is positionable.

Embodiments of the present invention are directed to positionable camera housing and a cellular telephone having a such a camera housing. Those of ordinary skill in the art will realize that the following detailed description of the present invention is illustrative only and is not intended to be in any way limiting. Other embodiments of the present invention will readily suggest themselves to such skilled persons having the benefit of this disclosure.

Reference will now be made in detail to implementations of the present invention as illustrated in the accompanying drawings. The drawings may not be to scale. The same reference indicators will be used throughout the drawings and the following detailed description to refer to the same or like parts. In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application and business related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

FIG. 1 shows a prior art cellular phone. The cellular phone 10 comprises a display screen 11, speaker 12, keypad 13 and microphone 14 in the front view. In the back view, the camera phone 10 has a retractable antenna 15 and camera 16. In common usage a user uses the screen 11 as a view finder for the camera 16. However, the camera 16 faces the opposite direction from the screen 11. While this can be useful to take photographs, it is not useful for self portraits or video conferencing, since users must point the camera 16 toward themselves, and the display screen 11 showing the captured image will necessarily face away from the user.

A simple prior art solution is to place a small mirror 17 adjacent to the camera 16. The user can see themselves in the mirror 17 but only view an approximation of the image that will be captured. Further, since most cell phones and similar appliances are carried in pockets and backpacks, such a mirror can easily be scratched or tarnished, thus severely limiting its usefulness.

Figure 2B:
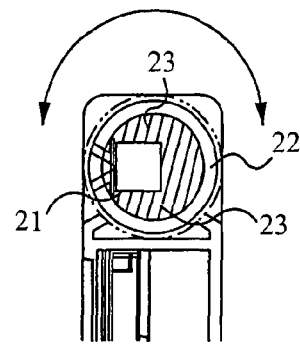

FIG. 2A shows front and back views of a prior art camera phone 20 having a positionable camera 21 rotatably coupled to the camera phone 20 by a barrel rotation mechanism 22. This allows the camera 21 to point toward the user or away from the user depending on the application. FIG. 2B shows a close up of the camera phone 20 bisected along the line A-B and above the line C. It is apparent from this view that the barrel rotation mechanism 22 which houses the camera 21 is an inefficient use of space. Because the barrel rotation mechanism 22 is round, there can be wasted space 23 (shaded area). No matter how small current technology allows the camera 21 to be designed, the rotation mechanism will require an area sufficient to rotate the camera housing. By way of example, if the thickness of the cellular phone or other appliance is 1 centimeter, and the length and width of the camera 21 are each 1 centimeter and the thickness of the camera is 0.5 centimeter, the total volume consumed is 1.58 cubic centimeters. Furthermore, the barrel rotation mechanism 22 adds unnecessary complexity, parts, and cost. Other dimensions and consumed volumes are possible.

Figure 2C:
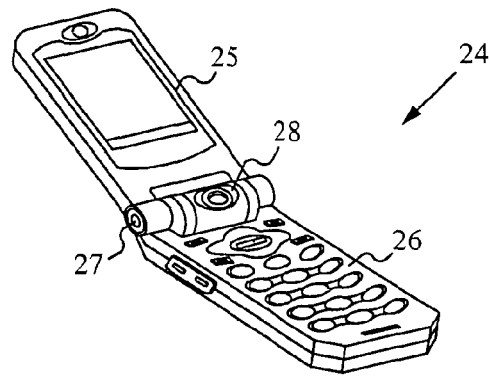

FIG. 2C shows a prior art flip style camera phone 24 having a first casing 25 coupled to a second casing 26 by a hinge 27. The camera 28 is rotatably housed within the hinge 27 so that the camera 28 can point to the user or away from the user. However, it is apparent that this solution is limited to flip style camera phones. Also, the same problem of wasted space as shown in FIG. 2B applies. The hinge must be made larger than necessary to house a camera. Such a larger hinge adds unnecessary complexity, parts and cost.

FIG. 3A shows the preferred embodiment of the current invention in the front and back view. A camera phone 30 has a casing 39, display screen 31, a speaker 32, a microphone 33 and a tactile interface 34 in the front view. Alternatively, the display screen 31 can comprise a tactile interface. In the back view, a camera housing 35 having a camera 36 is shown. The camera housing 35 is positionably coupled to the camera phone 30 by a simple hinge mechanism (not shown). In this position, the camera housing 35 comes to rest in a recessed cavity (not shown). A depression 38 along the recessed cavity is provided to allow the user to alter the position of the camera housing 35. In this position, the camera 36 points substantially away from the user, so that the user can take photos or video while still able to see the captured images the display screen 31.

In FIG. 3B, the camera phone 30 is shown in its alternate position. The camera housing 35 is positioned so that the camera 36 points substantially toward the user leaving the recessed cavity 38 empty. In this position, the user can take self portraits or engage in video conferencing while maintaining view of the captured image on the display screen 31. It is apparent from this view that the minimum size of the camera housing is not limited. As technology allows for smaller cameras, the camera housing can be made smaller to accommodate them. By way of example, if the camera 36 is 0.5 centimeters thick, and the length and width are 1 centimeter each, the total volume consumed is 0.5 cubic centimeters. Those of common skill in the art can appreciate that such a camera is not limited to a cellular phone, but rather can be applied to any appropriate electrical appliance such as a PDA, a laptop computer, a desktop computer, a multimedia device or a portable music player.

Figure 4A:
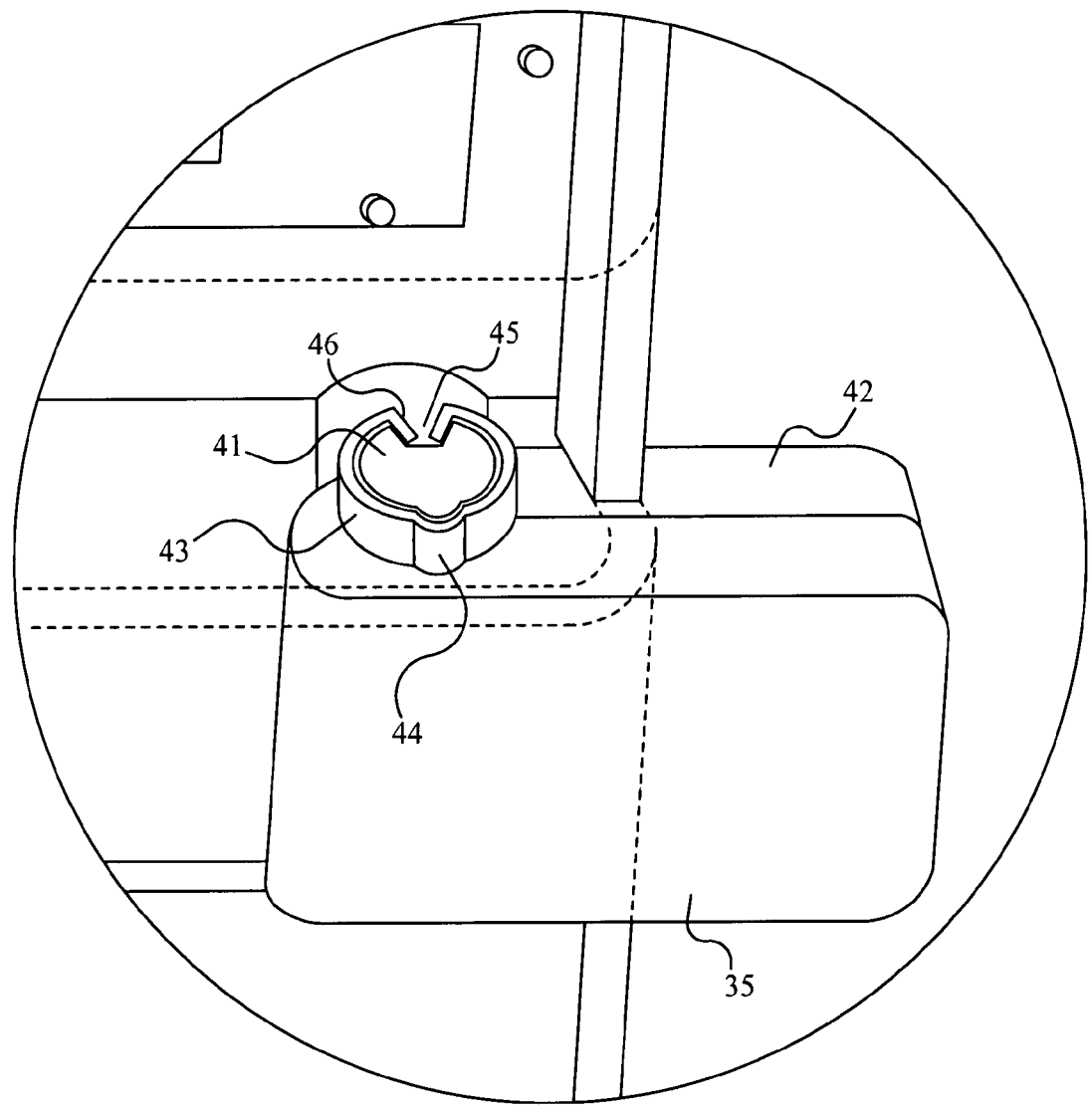
FIGS. 4A-4D show details of a simple hinge mechanism in the current disclosure.
Figure 4B:
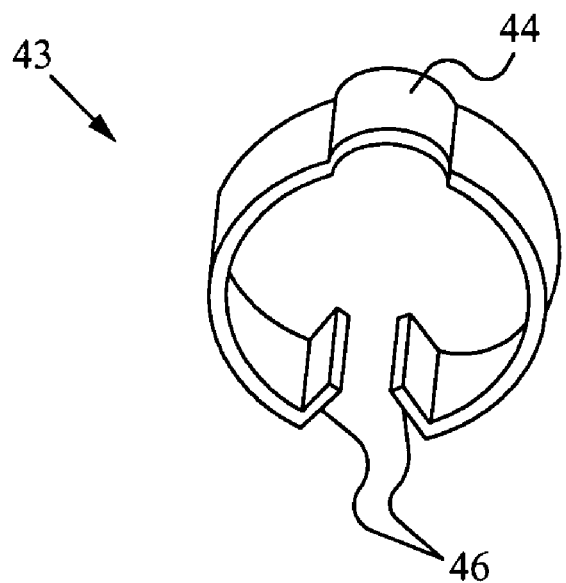

FIG. 4A shows a view of the preferred embodiment of the simple hinge mechanism 40 coupling the camera housing 35 to the camera phone 30. Camera housing 35 has a first pivot 41 on its top surface 42 and a second pivot (not shown) on its bottom surface (not shown). The first pivot 41 is configured to couple with a first socket (not shown) on the top surface of the recessed cavity (not shown). A latching sleeve 43 having a latching protrusion 44 and flanges 46 are used to couple the first pivot 41 to the first socket. The first pivot 41 has a notch 45 configured to receive the flanges 46 so that the latching sleeve 43 will not slip when coupled to the first pivot 41. A detailed view of the latching sleeve 43 is shown in FIG. 4B.

Figure 4C:
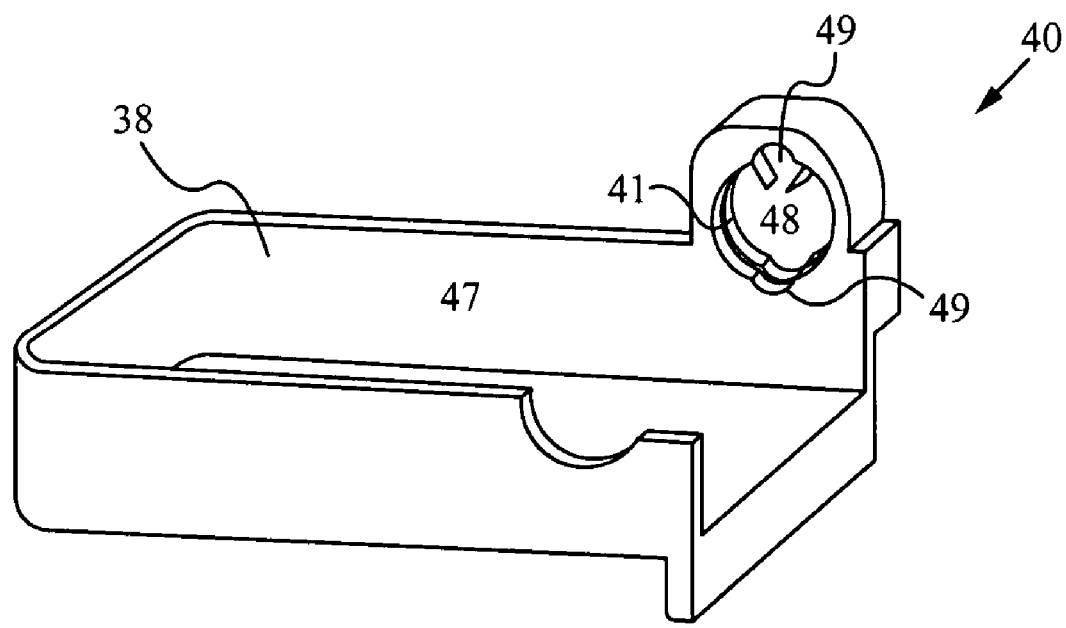

FIG. 4C shows another view of the simple hinge mechanism 40. The camera housing 35 is not shown for clarity. The recessed cavity 38 has a first socket 48 on its top surface 47 comprising two indentations 49 along the inner surface of the first socket 48. The indentations 49 are configured such that the latching protrusion 44 of the latching sleeve 41 can lock into either one of them, causing the camera housing 35 to be locked in either the first or the second positions shown in FIGS. 3A-3B.

Figure 4D:
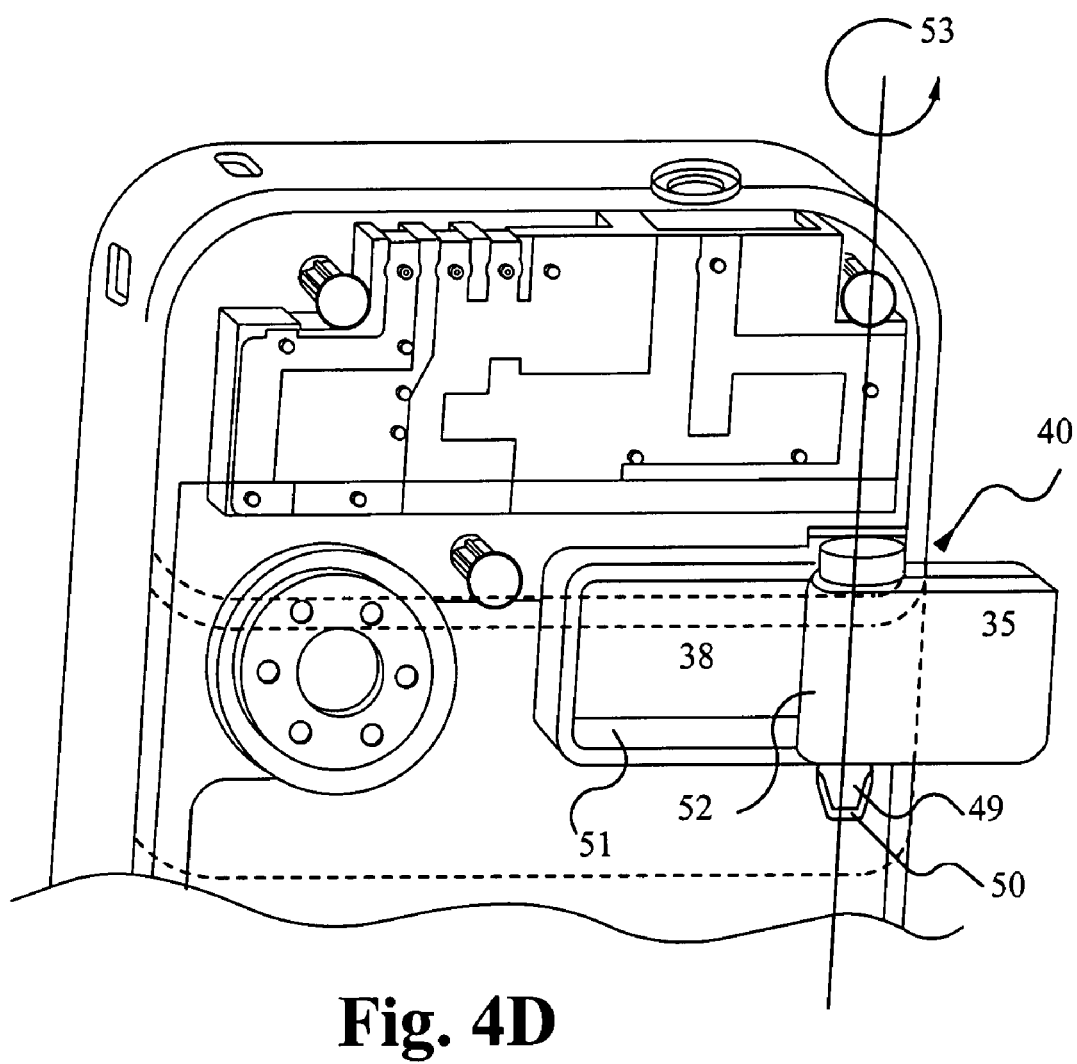

FIG. 4D shows another view of the simple hinge mechanism 40. By way of example, the camera phone 30 is shown in its first position. The camera housing 35 preferably further comprises a second pivot 49 configured to couple with a second socket 50 on the bottom surface 51 of the recessed cavity 38. The first 41 and second 49 pivots are configured to form an axis of rotation 53 around which camera housing 35 can rotate to one of its two positions. Furthermore, the camera housing 35 has a rounded end 52 to enable such rotation.

The present application has been described in terms of specific embodiments incorporating details to facilitate the understanding of the principles of construction and operation of the discreetly positionable camera housing. Many of the components shown and described in the various figures can be interchanged to achieve the results necessary, and this description should be read to encompass such interchange as well. As such, references herein to specific embodiments and details thereof are not intended to limit the scope of the claims appended hereto. It will be apparent to those skilled in the art that modifications can be made to the embodiments chosen for illustration without departing from the spirit and scope of the application.

I claim:

1. A mobile communication device comprising:
   a. an appliance housing having a recess, the recess having a top inner surface and a bottom inner surface;
   b. a display means;
   c. a camera: including a lens;
   d. a camera housing for positionably and rotatably coupling the camera to the appliance housing in two discrete positions by a hinge mechanism, wherein in a first position the display means is visible within a field of view of the lens and in a second position the display means is not visible within the field of view of the lens, wherein the camera housing is sized to fit within the recess in one of the first position and the second position, and wherein the hinge mechanism comprises:
      i. a first pivot on a top surface of the camera housing;
      ii. a second pivot on a bottom surface of the camera housing;
      iii. a first socket formed on the top inner surface of the recess, wherein the first socket has an inner surface and a first indentation and a second indentation on the inner surface, wherein the first socket is configured to receive the first pivot within the perimeter of its inner surface, wherein the first indentation and the second indentation are configured to lock the camera housing in a discrete position, and each one of the first indentation and the second indentation is a continuous surface configured to confine a latching protrusion aligned with the first or second indentation to within the perimeter of the inner surface of the first socket;
      iv. a second socket formed on the bottom inner surface of the recess and configured to receive the second pivot; and
      v. a locking sleeve including the latching protrusion for coupling the latching protrusion and the first socket, wherein the one of the first indentation and the second indentation is configured to receive the latching protrusion; and
   e. signal processing means to transmit and receive data;
   f. a speaker coupled with the appliance housing; and
   g. a microphone coupled with the appliance housing.

2. The mobile communication device in claim 1, wherein the mobile communication device is any one of a cellular phone, a digital camera, a PDA, a laptop computer, a desktop computer, a multimedia device and a portable music player.

3. The mobile communication device in claim 1, wherein the appliance housing has a front side and a back side, wherein the recess is located at the back side and the display means is located at the front side.

4. The mobile communication device in claim 1, wherein the electronic appliance has a longitudinal axis, and the camera housing rotates about the longitudinal axis.

5. The mobile communication device in claim 1, wherein an image corresponding to the field of view is not flipped as the camera housing moves from the first position to the second position.

6. A cellular telephone comprising:
   a. a casing including a recessed cavity
   b. signal processing means to transmit and receive data;
   c. a speaker coupled to the casing;
   d. a microphone coupled to the casing;
   e. a display screen coupled to the casing; and
   f. a camera housing including a camera, a top surface and a bottom surface, wherein the camera housing is coupled to the casing by a hinge mechanism, wherein the camera housing is positionable in a first position facing substantially towards a user and is positionable in a second position facing substantially away from the user and within the recessed cavity, wherein the hinge mechanism comprises:
      i. a first socket formed on a top inner surface of the recessed cavity, wherein the first socket has an inner surface and a first indentation and a second indentation formed on its inner surface, wherein each one of the first indentation and the second indentation is a continuous surface configured to confine a latching protrusion aligned with the first or second indentation to within the perimeter of the inner surface of the first socket;
      ii. a second socket formed on the bottom inner surface of the recessed cavity;
      iii. a first pivot on the top surface of the camera housing, wherein the first socket is configured to receive the first pivot;
      iv. a second pivot on the bottom surface of the camera housing, wherein the second socket configured to receive the second pivot; and
      v. a locking sleeve including the latching protrusion configured to latch into one of the first indentation and the second indentation on the first socket of the casing, wherein the locking sleeve is configured to couple between the first socket and the latching protrusion.

7. The cellular phone in claim 6, wherein the casing further comprises a depression along the recessed cavity such that the user can manipulate the camera housing between the first position and the second position.

8. The cellular phone in claim 6, wherein the display screen is capable of being used as a tactile interface.

9. The cellular phone in claim 6, wherein the casing has a longitudinal axis, and wherein the camera housing rotates about the longitudinal axis.

10. The cellular phone in claim 6, wherein, without orienting the cellular phone, the camera housing is configured to transition from facing substantially towards the user transitions to facing substantially away from the user.

11. The cellular phone in claim 6, wherein, without orienting the cellular phone, the camera housing is configured to transition from facing substantially away the user transitions to facing substantially towards from the user.

12. The cellular phone in claim 6, wherein the camera housing opens perpendicular to the casing.

13. The cellular phone in claim 6, wherein images captured by the camera are not flipped as the camera housing moves from the first position to the second position or from the second position to the first position.

14. The cellular phone in claim 6, wherein the camera housing is configured to be positionable between the first position and the second position.

* * * * *